United States Patent [19]

Kikinis

[11] Patent Number: 5,708,776
[45] Date of Patent: Jan. 13, 1998

[54] AUTOMATIC RECOVERY FOR NETWORK APPLIANCES

[75] Inventor: Dan Kikinis, Saratoga, Calif.

[73] Assignee: Elonex I.P. Holdings, London, United Kingdom

[21] Appl. No.: 647,165

[22] Filed: May 9, 1996

[51] Int. Cl.⁶ .................................................. G06F 11/34
[52] U.S. Cl. .............................. 395/185.08; 395/182.08
[58] Field of Search ................... 395/185.08, 182.04, 395/620, 652, 800, 489, 182.08, 180

[56] References Cited

U.S. PATENT DOCUMENTS

| | | | |
|---|---|---|---|
| 4,663,707 | 5/1987 | Dawson | 395/652 |
| 4,802,119 | 1/1989 | Heene et al. | 395/182.05 |
| 5,157,663 | 10/1992 | Major et al. | 395/182.08 |
| 5,367,669 | 11/1994 | Holland et al. | 395/182.05 |
| 5,390,324 | 2/1995 | Burckhartt et al. | 395/185.21 |
| 5,455,932 | 10/1995 | Major et al. | 395/489 |
| 5,528,750 | 6/1996 | Lubart et al. | 395/182.13 |
| 5,537,533 | 7/1996 | Staheli et al. | 395/182.03 |
| 5,564,054 | 10/1996 | Bramnick et al. | 395/652 |
| 5,572,659 | 11/1996 | Iwasa et al. | 395/182.04 |
| 5,596,711 | 1/1997 | Burckhartt et al. | 395/182.21 |

*Primary Examiner*—Ly Hua
*Attorney, Agent, or Firm*—Donald R. Boys

[57] ABSTRACT

An automatic recovery system for a network appliance features a watchdog processor that monitors operation of the appliance and initiates reboot as necessary. A primary and a secondary boot partition are provided in the system, in some embodiments on the same mass storage device, and in other embodiments on a different mass storage device. In the event reboot is unsuccessful from the primary boot partition, reboot is initiated from the secondary boot partition. The watchdog processor executes automatic recovery software stored in a non-volatile storage device, which may be a part of the same IC as the watchdog processor.

15 Claims, 2 Drawing Sheets

AUTOMATIC RECOVERY FOR NETWORK APPLIANCES

FIELD OF THE INVENTION

The present invention is in the area of methods and apparatus for safeguarding network appliances in the event a catastrophic failure occurs, and it is particular relevant to auxiliary servers with no long term data-storage requirements and with no user interfaces like keyboard, mouse and monitor and so forth.

BACKGROUND OF THE INVENTION

A computer network may have one or more small auxiliary servers with no long-term data-storage facilities and no keyboard or monitor. Typically, this type of auxiliary server has a small hard drive for its own operating software, and it may be used for data transfer functions such as Internet access, electronic mail, fax service, and remote access. Such a small auxiliary server is commonly known as a network appliance.

Although network appliances have a lower failure rate than major file servers, they may be monitored by a software-controlled device commonly referred to as a watchdog. In case a network appliance fails, its watchdog will sense the failure and attempt to reboot the CPU of the network appliance using the operating software stored on a resident hard disk. If the reboot is successful, the network appliance will resume operation. However, in the event that a part of the operating software or the appliance's application software is corrupted, the watchdog will be unable to restore proper operation of the network appliance. Consequently, that network appliance remains unavailable until a person that is responsible for its maintenance notices the failure and replaces the corrupted software.

What is clearly needed is a method to restore automatically proper operation of a network appliance that has failed as a result of corrupted operating or application software that is stored on the resident hard disk. Such a method eliminates the need for human intervention and, therefore, will significantly reduce the time that a network appliance is nonfunctional. This disclosure describes such an automatic recovery system.

SUMMARY OF THE INVENTION

In a preferred embodiment an automatic recovery system for a network appliance having a central processing unit (CPU), a mass storage device, and a non-volatile storage device is provided, comprising a system-independent watchdog processor coupled to the CPU and to the storage devices; a primary boot partition on the mass storage device, comprising primary operating software and primary application software for execution by the CPU in booting the network appliance and placing it in operation performing its application; a secondary boot partition on the mass storage device, comprising secondary operating software and secondary application software; and an automatic recovery routine on the non-volatile storage device. The watchdog processor, executing the automatic recovery routine, in the event of appliance failure initiates a reboot attempt from the secondary boot partition.

In some embodiments the primary and the secondary boot partitions are on the same mass storage device, and in others on separate mass storage devices. The watchdog processor is independent of the CPU of the appliance, and the automatic recovery software is stored in a non-volatile device, so the watchdog processor has access to it and can execute it even if the appliance is down. In some embodiments the watchdog processor and the non-volatile storage device may be in the same IC.

Preferably the secondary operating software and the primary operating software are identical, but this is not a requirement. In preferred embodiments the watchdog processor attempts to reboot the appliance first from the primary boot partition, and counts reboot attempts. After a preset number of attempts in a preset time, boot attempts are switched to the secondary partition.

In other aspects of the invention network appliances are provided equipped with the recovery system described, and in other aspects, methods for recovery are provided.

DESCRIPTION OF THE PREFERRED EMBODIMENTS

Figure 1:
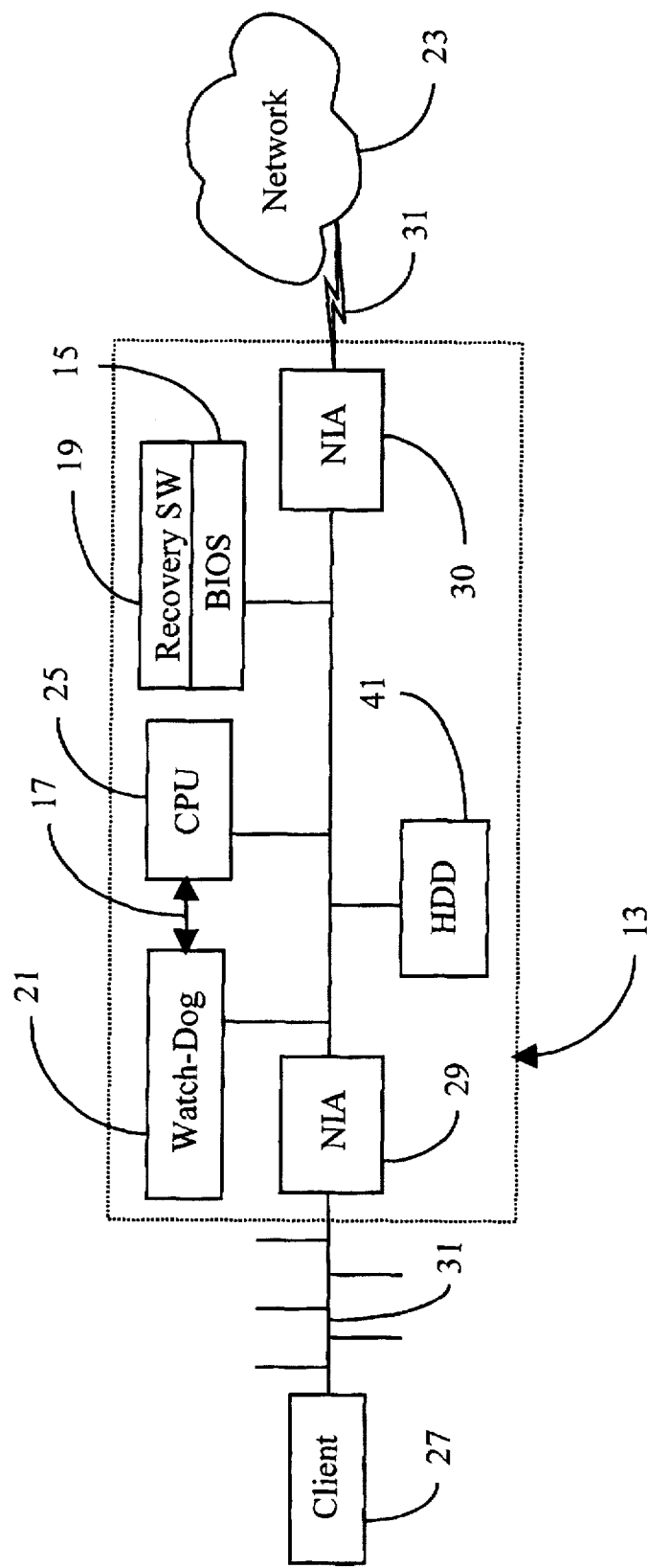
FIG. 1 is a block diagram illustrating a network appliance equipped with an automatic recovery system according an embodiment of the present invention.

FIG. 1 is a block diagram illustrating a network appliance 13 equipped with an automatic recovery system according an embodiment of the present invention. Network appliance 13 controls a network ports 29 and 30 between a network 23 and client 27, and it may operate according to any of several network protocols known in the art. There is no requirement to have two ports 29 and 30, and if there is more than one port, they can have the same or all different protocols in any combination.

Network appliance 13 comprises, but is not limited to, a Central Processing Unit (CPU) 25, a disk-type storage device (HDD) 41 which configuration includes a primary bootable partition and a read-only secondary bootable partition, a watchdog device 21 that may take the form of a small system-independent microprocessor, a software recovery routine 19 that resides within the network appliance independently from hard disk 41, and a BIOS ROM 15 as well as network interface adapters 29 and 30.

Watchdog device 21 may be an integrated circuit (IC) that is integrated into any of the other ICs or it may exist as additional elements in network appliance 13. Software recovery routine 19 may be stored in the system BIOS ROM, a ROM, a battery backed-up RAM, or any other nonvolatile storage device.

It is known to the inventor and in the art that in the event of failure of a network appliance, its watchdog device will sense the failure and will signal CPU 25, by means of its system bus, an I/O port, an interrupt, a register, memory, or any other suitable method, to reboot CPU 25 by executing software programs that are stored on hard disk 41. However, this method of restoring proper operation of a network appliance has a serious problem. This problem lies in the fact that a part of the CPU's operating software or the appliance's application software, both stored on hard disk 41, can be corrupted, for example by a glitch in power during update of a file allocation table, and consequently, watchdog device 21 will be unable to reboot CPU 25 and restore proper operation of the network appliance. Consequently, a network appliance with corrupted software remains unavailable until a human notices the failure and intervenes.

Figure 2:
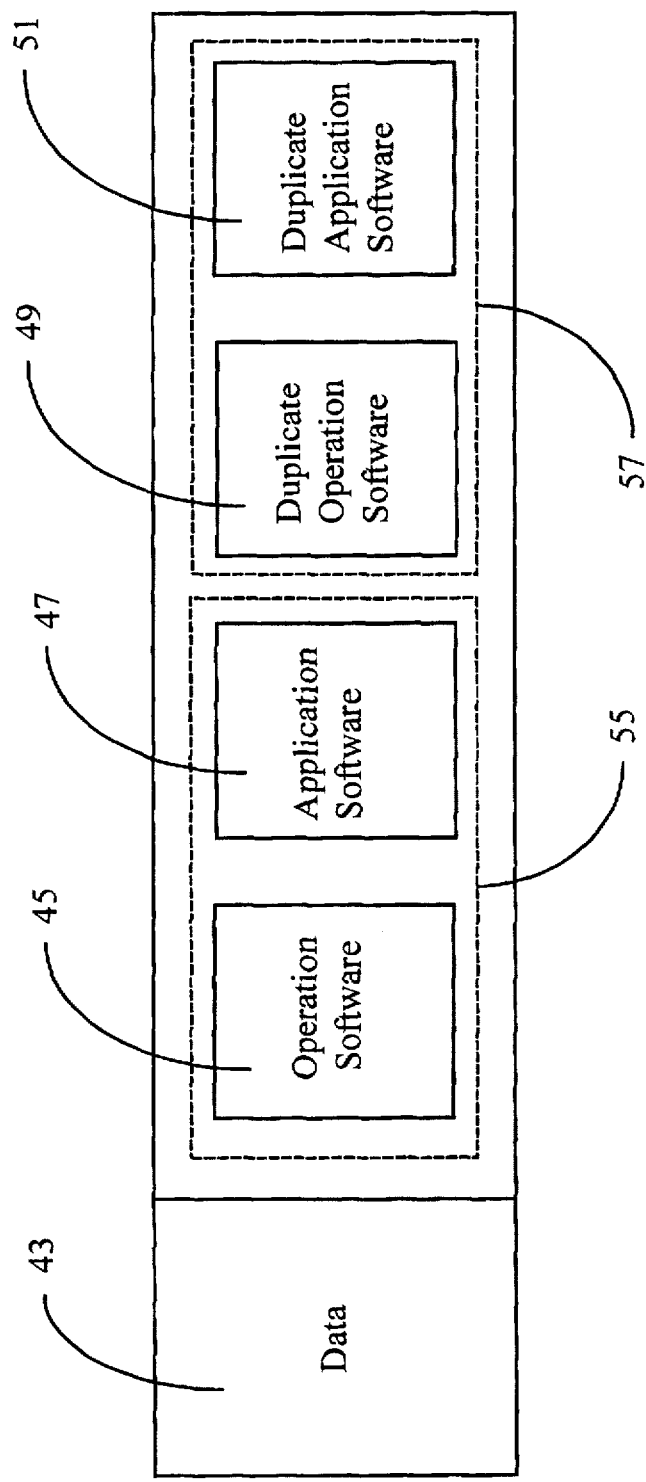
FIG. 2 is a block diagram illustrating a possible partitioning of a hard disk of an automatic recovery system for a network appliance according an embodiment of the present invention.

FIG. 2 is a block diagram illustrating a method to create an automatic recovery system by means of uniquely partitioning the recording space of hard disk 41 (FIG. 1) according an embodiment of the present invention. As shown in FIG. 2, the recording space of hard disk 41 (FIG. 1) is partitioned in this embodiment into a data partition 43, a primary boot partition 55 that retains both operating software 45 and application software 47, and a secondary boot partition 57, or shadow partition, that retains operating software 49 that is an exact duplicate of operating software 45, and application software 51 that is an exact duplicate of application software 47. Such a secondary partition 57 could also be stored on a second drive, and the invention is not limited to storing the duplicate software on the same drive.

An automatic recovery routine (see item 19 in FIG. 1) according to this embodiment of the present invention, keeps track of the number of reboots that occur within a certain time period. The number of performed reboots indicates whether watchdog device 21 is successful in rebooting the network appliance in event of a failure. If the number of reboots is greater than a preset threshold number in a given period of time, that result indicates failing reboot cycles which most likely are caused by a corrupted primary partition 55. In response, the automatic recovery routine attempts to reboot CPU 25 using duplicate operating software 49 and if successful re-installs duplicate application software 51 stored in shadow partition 57 to restore proper operation of network appliance 13. In some embodiments the application software 51 may be in compressed form, and be decompressed as needed. In other embodiments, the recovery system may also reinstall portions or all of the code in the first boot partition. Due to this automatic recovery system, a total catastrophic failure of a network appliance can be avoided and therefore will cause only a relatively brief period of disruption of service to clients.

It will be apparent to those with skill in the art that there are many possible variations for the storage of an automatic recovery routine and secondary operation and application software. For example, a second hard disk may be used to store bootable operation software as well as application software. In addition, the watchdog may be configured to automatically send error messages to a remote monitoring station on the network when an appliance fails.

It will be apparent to those with skill in the art that there will be many alterations that might be made in the embodiments of the invention described herein without departing from the spirit and scope of the invention. Some of the variations have already been mentioned. Others include the fact that the primary and secondary operating software and application software do not necessarily have to be exact copies, but do have to be capable of performing the requisite functions of operation and application.

What claimed is:

1. An automatic recovery system for a network appliance having a central processing unit (CPU), a mass storage device having a first boot partition comprising an operating system and application software, and a non-volatile storage device, comprising:

a system-independent watchdog processor coupled to the CPU and to the storage devices;

a second boot partition on the mass storage device, comprising a copy of the operating software and a copy of the application software; and an automatic recovery routine on the non-volatile storage device;

wherein the watchdog processor, executing the automatic recovery routine, in the event of appliance failure, initiates reboot from the second boot partition thereby placing the network appliance back in service without human intervention.

2. An automatic recovery system as in claim 1 further comprising a second mass storage device, and wherein the first and second boot partitions reside respectively on the first and second mass storage devices.

3. An automatic recovery system as in claim 1 wherein the watchdog processor and the non-volatile storage device comprise a single integrated circuit (IC).

4. An automatic recovery system as in claim 1 wherein the watchdog processor, executing the automatic recovery routine, monitors reboot attempts from the first partition, and initiates reboot from the second partition as a consequence of the reboot attempts from the first partition exceeding a preprogrammed number of attempts in a preprogrammed time period.

5. The system of claim 1 wherein, after reboot from the second boot partition, automatically placing the appliance back in service, the automatic recovery system copies the operating system and the application software from the second boot partition into the first boot partition, thereby repairing the first boot partition.

6. A network appliance having a central processing unit (CPU), a mass storage device having a first boot partition comprising an operating system and application software, and a non-volatile storage device, comprising:

a system-independent watchdog processor coupled to the CPU and to the storage devices;

a second boot partition on the mass storage device, comprising a copy of the operating software and a copy of the application software; and an automatic recovery routine on the non-volatile storage device;

wherein the watchdog processor, executing the automatic recovery routine, in the event of appliance failure initiates a reboot attempt from the second boot partition thereby placing the network appliance back in service without human intervention.

7. A network appliance as in claim 6 further comprising a second mass storage device, and wherein the first and second boot partitions reside on separate mass storage devices.

8. A network appliance as in claim 6 wherein the watchdog processor and the non-volatile storage device comprise a single integrated circuit (IC).

9. A network appliance as in claim 6 wherein the watchdog processor, executing the automatic recovery routine, monitors reboot attempts from the first partition, and initiates reboot from the second partition as a consequence of the reboot attempts from the first partition exceeding a preprogrammed number of attempts in a preprogrammed time period.

10. The network appliance of claim 6 wherein, after reboot from the second boot partition, automatically placing the appliance back in service, the automatic recovery system copies the operating system and the application software from the second boot partition into the first boot portion, thereby repairing the first boot partition.

11. A method for rebooting a network appliance having a CPU, a mass storage device having a first and a second boot partition each comprising an identical operating system and application software, and a non-volatile storage device, comprising steps of:

(a) monitoring operation of the appliance for failure requiting reboot via an on-board watchdog processor executing, independently of the CPU, automatic recovery software stored on the non-volatile storage device;

(b) initiating reboot from the first boot partition on the mass storage device in the event of failure requiring reboot; and (c) initiating reboot from the second boot partition on the mass storage device in the event that reboot from the first boot partition is unsuccessful.

12. The method of claim 11 wherein the second boot partition is on a second mass storage device, and, in step (c), the reboot from the second boot partition is from the second mass storage device.

13. The method of claim 11 wherein the watchdog processor and the non-volatile storage device comprise a single integrated circuit (IC).

14. The method of claim 11 wherein, in step (c), the watchdog processor, executing the automatic recovery routine, monitors reboot attempts from the first boot partition, and initiates reboot from the second boot partition as a consequence of the reboot attempts from the first boot partition exceeding a preprogrammed number of attempts in a preprogrammed time period.

15. The method of claim 11 further comprising a step (d) copying the operating system and application software from the second boot partition into the first boot partition.

* * * * *